United States Patent
Barthel et al.

(10) Patent No.: US 8,139,779 B2
(45) Date of Patent: Mar. 20, 2012

(54) METHOD FOR THE OPERATIONAL CONTROL OF A HEARING DEVICE AND CORRESPONDING HEARING DEVICE

(75) Inventors: Roland Barthel, Erlangen (DE); Frank Beck, Spardorf (DE); Robert Bäuml, Eckental (DE); Eghart Fischer, Schwabach (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1209 days.

(21) Appl. No.: 11/904,584

(22) Filed: Sep. 27, 2007

(65) Prior Publication Data

US 2008/0144866 A1   Jun. 19, 2008

(30) Foreign Application Priority Data

Sep. 29, 2006   (DE) .................. 10 2006 046 315

(51) Int. Cl.
    *H04R 29/00* (2006.01)
(52) U.S. Cl. .................. 381/60; 381/312; 381/314
(58) Field of Classification Search .............. 381/60, 381/312, 314, 315
    See application file for complete search history.

(56) References Cited

U.S. PATENT DOCUMENTS

| | | | |
|---|---|---|---|
| 5,604,812 A * | 2/1997 | Meyer | 381/314 |
| 7,242,777 B2 | 7/2007 | Leenen et al. | |
| 7,340,231 B2 | 3/2008 | Behrens et al. | |
| 7,499,559 B2 | 3/2009 | Wyrsch | |
| 2004/0066944 A1 | 4/2004 | Leenen et al. | |
| 2005/0281424 A1 | 12/2005 | Rass | |
| 2006/0023905 A1 | 2/2006 | Fischer | |
| 2006/0179018 A1 | 8/2006 | Messmer et al. | |

FOREIGN PATENT DOCUMENTS

| | | |
|---|---|---|
| DE | 10053179 A1 | 5/2001 |
| DE | 102004025691 B3 | 8/2005 |
| EP | 1367857 A1 | 12/2003 |
| EP | 1624721 A2 | 2/2006 |
| WO | 03032681 A1 | 4/2003 |
| WO | 2004056154 A2 | 7/2004 |

* cited by examiner

*Primary Examiner* — Victor A Mandala
*Assistant Examiner* — Scott Stowe

(57) ABSTRACT

The aim of the invention is to make using a hearing device and in particular a hearing aid more comfortable and more effective for the user. To this end the setting of a portable hearing device is to be checked. First the acoustic data of a sound from the environment of the hearing device is recorded and/or determined simultaneously with the setting of the hearing device with at least one setting value. The setting of the hearing device is evaluated against the chronologically matching, recorded acoustic data in the hearing device using at least one predeterminable criterion. If necessary, the hearing device outputs an appropriate message. By this means a hearing aid wearer can, for example, be alerted to contact an acoustician, if the settings he made on the hearing aid are not effective.

17 Claims, 2 Drawing Sheets

METHOD FOR THE OPERATIONAL CONTROL OF A HEARING DEVICE AND CORRESPONDING HEARING DEVICE

CROSS REFERENCE TO RELATED APPLICATIONS

This application claims priority of German application No. 10 2006 046 315.3 filed Sep. 29, 2006, which is incorporated by reference herein in its entirety.

FIELD OF THE INVENTION

This invention relates to a method for checking a setting of a portable hearing device with at least one setting value. In addition, this invention relates to a corresponding hearing device, which can be worn on or in the ear. The term hearing device is understood here to refer to any communication device that can be worn in or on the ear, in particular a hearing aid, a headset or headphones.

BACKGROUND OF THE INVENTION

Hearing aids are portable hearing devices that serve to support those who are hard-of-hearing. In order to cater for the numerous individual requirements, different designs of hearing aids are provided such as behind-the-ear hearing aids (BTE), in-the-ear hearing aids (ITE) and concha hearing aids. The hearing aids listed as examples are worn on the exterior of the ear or in the auditory canal. But there are in addition also bone-conduction hearing aids, implantable or vibrotactile hearing aids available on the market. Thereby the impaired sense of hearing is stimulated either mechanically or electrically.

In principle, as essential components, hearing aids have an input transducer, an amplifier and an output transducer. The input transducer is, as a rule, a sound pickup, e.g. a microphone, and/or an electromagnetic receiver, e.g. an induction coil. The output transducer is usually realized as an electro acoustic transducer, e.g. miniature loudspeaker, or as an electromechanical transducer, e.g. bone conduction receiver. The amplifier is usually integrated into a signal processing unit. This basic design is shown in FIG. 1 using the example of a behind-the-ear hearing aid. One or several microphones 2 for picking up ambient sound are installed in a hearing aid housing 1 for wearing behind the ear. A signal processing unit 3, which is also integrated into the hearing aid housing 1, processes the microphone signals and amplifies them. The output signal of the signal processing unit 3 is transmitted to a loudspeaker or receiver 4, which outputs an acoustic signal. The sound is transmitted if necessary to the eardrum of the hearing aid wearer via an acoustic tube which is fixed with an otoplastic in the auditory canal. A battery 5 which is also integrated into the hearing aid housing 1 provides the power supply to the hearing aid and in particular to the signal processing unit 3.

Modern digital hearing aids can be configured in many ways so they can be adapted to the individual hearing aid wearer. Nevertheless it cannot be predicted how the hearing impaired person copes with the settings of the device. The environment in which the hearing aid wearer moves is varied, and, therefore, with certain sound backgrounds, unforeseen problems may arise, where, for example, the hearing sensation is unpleasant or there are problems with understanding speech. In some cases, the user's perception of the noise generated by the hearing aid also depends on the emotional state of the user. Such factors cannot be taken into account technically and result in a dissatisfaction of the user with his device that is difficult to explain objectively.

With modern hearing aids, during the so-called data logging, information is recorded about the user's environment in order to support adaptation to the typical environment. The publication EP 1 367 857 A1, for example, shows a data recording method of this kind. According to the information given there, hearing aid variables are recorded, which contain, for example, logical states of control elements that can be controlled by the user or parameter values of digital signal processors. By means of a recording both of the hearing aid variables and also of the input signal data it is possible to recognize correlations between predetermined signal events in the input signal data and hearing aid operations.

In addition, the patent specification DE 102004025691 B3 describes a hearing aid with an operating device. The acoustic hearing environment, in which the hearing aid is located, is analyzed, and, according to the hearing situation thus recognized, an adjustment function according to the respective hearing situation is assigned to the operating element. The setting capability of the hearing aid is thus limited to the setting capabilities that are appropriate for the respective hearing situation.

Configuring information signals freely in the case of hearing aids is known from the publication EP 1 624 721 A2. This serves to better inform the user as to specific settings or states of his/her hearing aid. Thus the user can find out for example whether the actual hearing situation was correctly recognized by the classifier, as it contains corresponding information material. Thus the user can check the current setting of his/her hearing aid.

SUMMARY OF THE INVENTION

The object of this invention is to assist the user in the setting of a portable hearing device and in particular of a hearing aid, in order to achieve greater acceptance of the device.

According to the invention this object is achieved with a method for checking a setting of a portable hearing device by setting the hearing device with at least one setting value, recording and/or determining acoustic data of a sound from the environment of the hearing device simultaneously with the setting of the at least one setting value in the hearing device and evaluation of the setting against the chronologically matching, recorded acoustic data in the hearing device, using at least one predetermined criterion.

In addition, according to the invention a hearing device is provided which can be worn on or in the ear, with a setting device for setting the hearing device with at least one setting value, a recording device for recording and/or determining acoustic data of a sound from the environment of the hearing device simultaneously with the setting, and a evaluator to evaluate the at least one setting value against the chronologically matching, recorded/determined acoustic data using at least one predetermined criterion.

Advantageously, by recording the reaction of the user to the environment, specific settings on the device that reduce the extent of subsequent after-care can be made. In this way the acceptance of the device increases and non-technical causes for the user behavior, e.g. emotional states, can be taken into account or identified.

The above named setting value can be, for example, a parameter of a signal processing device of the hearing device. Such setting values can be easily provided or stored as they are there explicitly. But setting values, e.g. the setting angle of a setting wheel, which angle is measured with a dedicated sensor, can also be stored and used for the check.

Preferably, the acoustic data contain classification information of the hearing device on the sound from the environment, and this classification information is used for the evaluation or for the setting check. This classification information enables the setting to be checked more easily.

The at least one setting value can relate to a volume or a program identification. Thus, for example, the most common settings of a hearing aid, namely the volume and the program selection, can be recorded for the check in accordance with the relevant acoustic situation.

In addition, the checking of the setting of the hearing device can be part of an automatic learning process of the hearing device, whereby a result of the evaluation step is used for an abort criterion of the automatic learning process. This allows the learning to be aborted if, for example, adjusting over a longer period of time is not considered to be effective.

Further the hearing device can notify the user of the result of the evaluation step optically or acoustically. This has the advantage that the user immediately receives a feedback of the automatic check of the settings.

During the evaluation, a current setting value and the current acoustic data can be compared with earlier or predetermined setting values and corresponding acoustic data. Thus the adjusting can either be checked relatively using a history or be assessed absolutely using predetermined data.

A particular advantage of checking the setting by means of the portable hearing device or the hearing aid itself, lies in that it can be determined as fast as possible whether the settings are useful in the day-to-day use of the hearing device. In this way one can largely avoid the user being dissatisfied with his device.

BRIEF DESCRIPTION OF THE DRAWINGS

This invention is described in greater detail using the attached drawings showing.

DETAILED DESCRIPTION OF THE INVENTION

The exemplary embodiments described below in more detail represent preferred embodiments of this invention.

Figure 1:
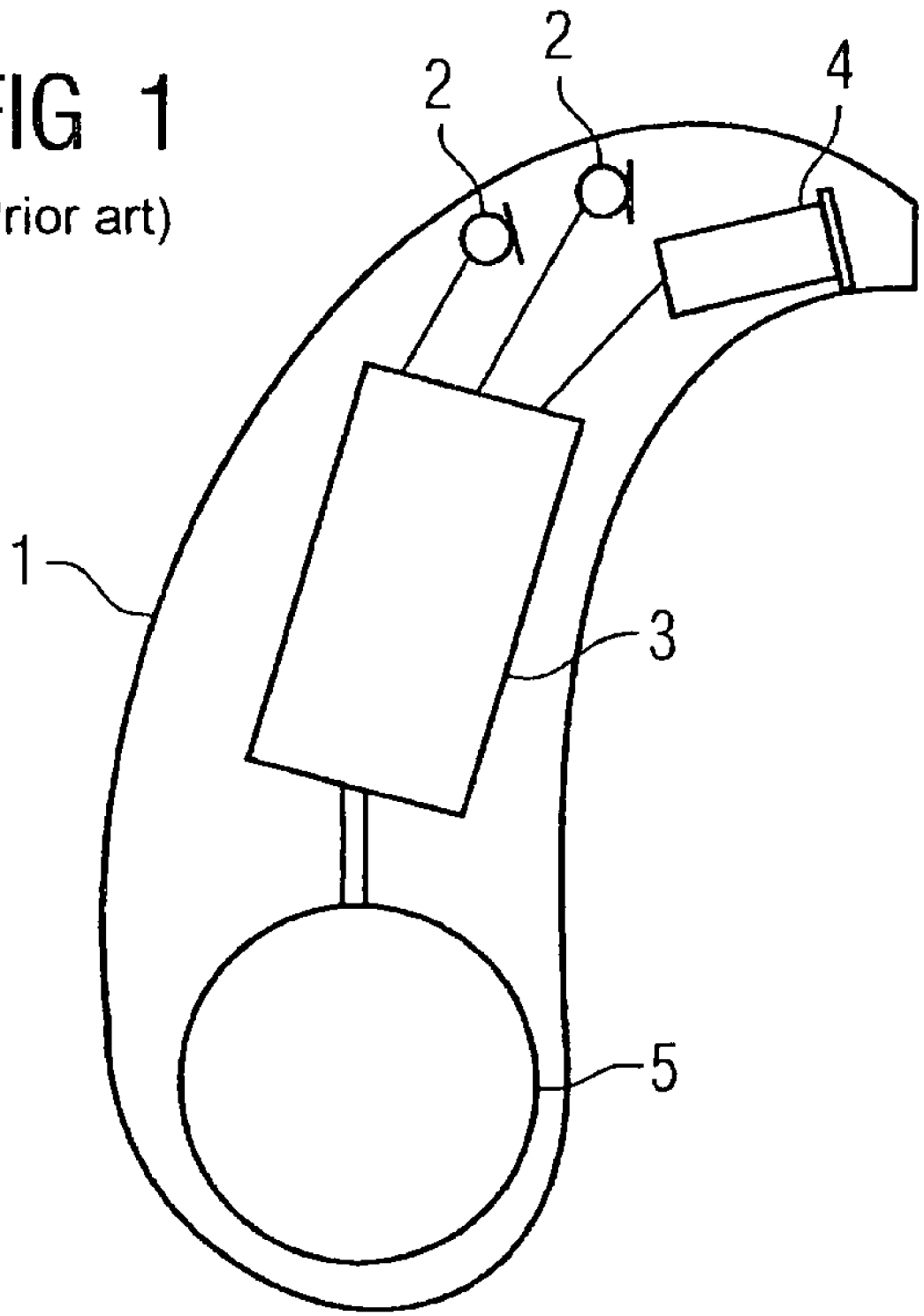
FIG. 1 the basic design of a hearing aid.
Figure 2:
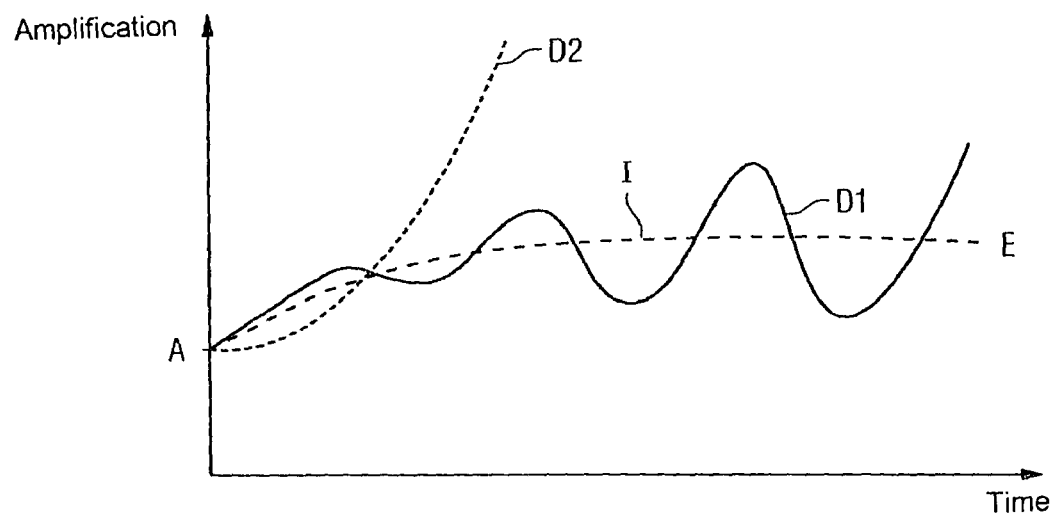
FIG. 2 several setting curves in relation to time.

A basic component of the inventive method is to record the user behavior according to his/her environment. In FIG. 2 different possibilities of user behavior are indicated symbolically. As an example, here has been chosen how the user sets the amplification of the hearing aid in relation to time. It is to be presumed here that a classification has been made of the hearing situation and this hearing situation does not change in the period of time under consideration. Specifically, the example of FIG. 2 refers to the amplification that the user sets in a specific hearing situation. In the ideal case I (broken line) in the course of time, the user adjusts the amplification starting from an initial value A to a final value E, which remains constant. This ideal case applies as the basis for the check as to whether the user makes an effective setting on his/her device.

In another case the user adjusts the amplification according to the unbroken line D1. This curve D1 is divergent and does not converge to the ideal final value E. Rather it alternates and shows the ever increasing uncertainty of the user. User behavior of this kind when adjusting the hearing device will sooner or later result in the user being frustrated.

A further example of setting behavior is shown by the curve D2, which, starting from the initial value A likewise does not converge to the final value E, but diverges like curve D1. The reason for this divergence and for the amplification being set higher and higher, can be that the user's loss of hearing is getting worse and the device is no longer adequate for the hearing loss or, for example, the battery power has weakened. A check e.g. using a comparison with the ideal curve I or using a history (for example difference to earlier setting values), can also be used in this case to determine that the setting is not effective according to curve D2.

Figure 3:
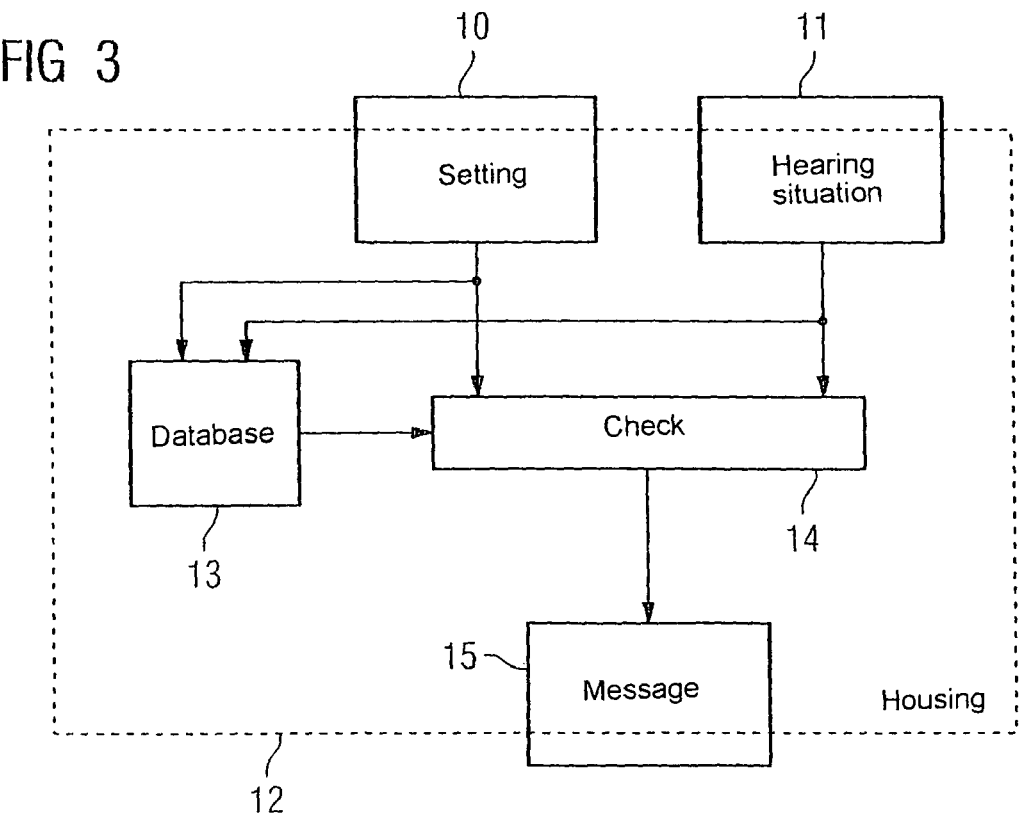
FIG. 3 a block diagram of an inventive hearing device.

FIG. 3 shows a block diagram of a hearing aid that can automatically implement a check of the setting values in accordance with the invention. The checking of setting 10 of the signal processing of the hearing aid according to the respective hearing situation 11 is carried out automatically in the hearing aid i.e. in its housing 12. The hearing aid user effects the setting 10 manually for example and the hearing situation 11 is determined in the hearing aid via one or several microphones and for example in a suitable classifier. Typical setting data, which can be checked here, are, for example, the volume setting, the program setting etc. This data is recorded in a database 13 inside the hearing aid. As a result, at a later point in time, the acoustician can, if need be, understand, how the user reacted to the environment. It can be determined whether there is a technical problem or a faulty configuration of the hearing aid, or whether the user reacted to the environment more or less according to mood and no improvement can be expected from a modification to the configuration. In addition, the recordings of problem cases can be passed on to the developmental departments of the device manufacturer in order to be able to make possible improvements, for example in the adaptation software.

Corresponding to the example of FIG. 3, a check 14 is made, directly in the hearing aid, of the setting 10 in the current hearing situation 11 compared with the data from database 13. This data from the database represents here a history of the settings in the respective hearing situations. Thus it is possible to check how the current setting has changed compared with the settings from the past. If the difference from a directly preceding setting becomes bigger and bigger (cf. curve D2 from FIG. 2), this indicates a divergent curve and the hearing aid provision is not adequate.

The check 14 can, however, also made using for comparison the data of database 13, which were pre-input into the hearing aid. In this way a comparison is made against absolute data and it is not necessary here to record the current data in the database 13, as indicated in FIG. 3. For example, the ideal curve I from FIG. 2 can be stored in the database 13. In the check of, for example, the curve D1, it is then determined that the difference from the ideal curve I fluctuates and gets bigger and bigger. This also indicates unsuitable provision.

The result of the check 14 is used to generate a message 15 in the hearing aid. This message can be supplied to the hearing aid wearer for example acoustically. Alternatively or in addition, the message can, however, also be represented for example optically on a remote control of the hearing aid. The message could read, for example: "Please contact acoustician". The hearing aid wearer is thus automatically alerted to seek professional help, when the operation or setting of the device does not appear to be effective.

The invention claimed is:

1. A method for checking a setting of a hearing device, comprising:
   setting the hearing device with a setting value;
   associating with the setting value acoustic data of a sound acquired by the hearing device subject to a respective acoustic environment populating a database of the hearing device with data indicative of a plurality of historical setting values at least corresponding to acoustic data of sounds acquired by the hearing device subject to the respective acoustic environment;

evaluating whether or not the setting value follows a divergent curve relative to the historical setting values corresponding to the respective acoustic environment; and based on a result from the evaluating, communicating to a user of the hearing device a recommended action.

2. The method as claimed in claim 1, wherein the setting value is a parameter of a signal processing device of the hearing device.

3. The method as claimed in claim 1, wherein the acoustic data comprises information indicative of a classification of the respective acoustic environment.

4. The method as claimed in claim 1, wherein the setting value relates to a volume or a program identification.

5. The method as claimed in claim 1, wherein a result of the evaluating is processed to be an interrupt criterion of an automatic learning process of the hearing device.

6. The method as claimed in claim 1, wherein a result of the evaluating is optically or acoustically communicated to the user of the hearing device.

7. The method as claimed in claim 1, wherein the evaluating comprises comparing a present setting value and present acoustic data acquired subject to the respective acoustic environment with the historical setting values and corresponding acoustic data acquired subject essentially to the same respective acoustic environment.

8. The method as claimed in claim 1, wherein the hearing device is a portable hearing device.

9. A hearing device, comprising:

a setting device configured to set the hearing device with a setting value;

a recording device configured to associate with the setting value acoustic data of a sound acquired by the hearing device subject to a respective acoustic environment a database populated with data indicative of a plurality of historical setting values at least corresponding to acoustic data of sounds acquired by the hearing device subject to the respective acoustic environment;

an evaluator coupled to the database and configured to evaluates whether or not the setting value follows a divergent curve relative to the historical setting values and further configured to issue a recommended action to a user of the hearing device based on a result from an evaluation by the evaluator.

10. The hearing device as claimed in claim 9, further comprising a learning device configured to interrupt an automatic learning process of the hearing device based on a result of the evaluation.

11. The hearing device as claimed in claim 9, further comprising a user interface configured to optically or acoustically notify the user of the hearing device about a result of the evaluation.

12. The hearing device as claimed in claim 9, wherein the setting value is a parameter of a signal processing device of the hearing device.

13. The hearing device as claimed in claim 9, wherein the acoustic data comprises information indicative of a classification of the respective acoustic environment.

14. The hearing device as claimed in claim 9, wherein the setting value relates to a volume or a program identification.

15. The hearing device as claimed in claim 9, wherein the evaluator includes a comparator configured to compares a present setting value and a present acoustic data acquired subject to the respective acoustic environment with the historical setting values and corresponding acoustic data acquired subject essentially to the same respective environment.

16. The hearing device as claimed in claim 9, wherein the hearing device can be worn on or in an ear of a user.

17. Method for checking a setting of a hearing device, comprising:

setting the hearing device with a setting value;

associating with the setting value acoustic data of a sound acquired by the hearing device subject to a respective acoustic environment;

providing a memory loaded with a predefined plurality of setting values at least corresponding to the respective acoustic environment, the plurality of setting values configured to eventually reach a constant setting value over a time horizon;

evaluating whether or not the setting value follows a divergent curve relative to the predefined plurality of setting values; and based on a result from the evaluating, communicating to a user of the hearing device a recommended action.

* * * * *